UNITED STATES PATENT OFFICE.

THOMAS A. EDISON, OF NEWARK, NEW JERSEY.

IMPROVEMENT IN PAPER FOR CHEMICAL TELEGRAPHS, &c.

Specification forming part of Letters Patent No. 132,455, dated October 22, 1872.

*To all whom it may concern:*

Be it known that I, THOMAS A. EDISON, of Newark, in the county of Essex and State of New Jersey, have invented an Improvement in Preparing Chemical Paper or other material for telegraphic purposes; and the following is declared to be a correct description of the same.

Before my invention iodide of potassium had been employed in the preparation of chemical paper for receiving telegraphic communications by dots and dashes, and starch had been mixed with this solution of iodide of potassium to cause its adhesion to the paper. In receiving telegraphic communications, while the paper remained damp, this operated very well, but when the paper became dry the starch was liable to crack and peel off.

My invention is made to avoid the before-named difficulty, by using a vehicle for the iodide of potassium that will not crack or scale off the paper when dry. In order to make use of the starch in the solution, it is necessary to use hot water or to boil the same, otherwise the starch will not remain with uniformity throughout the solution during the soaking operation to which the paper is subjected.

I have discovered that a very thin paste made of flour and water will retain the iodide of potassium uniformly in solution during the soaking operation to which the paper is subjected; it will not make the paper hard or brittle, but will penetrate the fabric, and no portion of the surface will crack or scale off when the paper becomes dry. Furthermore, during the time that the paper is kept moist ready for use, there is but little tendency to deteriorate or become injured by atmospheric influences, especially if kept in tin cans or jars, and if the paper becomes too dry it can easily be remoistened.

I prefer that the flour and water be mixed together while the water is warm, and, I remark, that fine wheat flour is the best, but rye or other flour may be employed.

I claim as my invention—

The chemical paper for telegraphic purposes, prepared in the manner specified.

Signed by me this 10th day of April, A. D. 1872.

T. A. EDISON.

Witnesses:
 GEO. T. PINCKNEY,
 CHAS. H. SMITH.